United States Patent
Youn et al.

(10) Patent No.: US 11,430,977 B2
(45) Date of Patent: Aug. 30, 2022

(54) LITHIUM ELECTRODE AND LITHIUM SECONDARY BATTERY COMPRISING SAME

(71) Applicant: LG CHEM, LTD., Seoul (KR)

(72) Inventors: Suk Il Youn, Daejeon (KR); Byoungkuk Son, Daejeon (KR); Junghun Choi, Daejeon (KR); Minchul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 143 days.

(21) Appl. No.: 16/646,125

(22) PCT Filed: Oct. 16, 2018

(86) PCT No.: PCT/KR2018/012151
§ 371 (c)(1),
(2) Date: Mar. 10, 2020

(87) PCT Pub. No.: WO2019/078571
PCT Pub. Date: Apr. 25, 2019

(65) Prior Publication Data
US 2020/0274142 A1    Aug. 27, 2020

(30) Foreign Application Priority Data

Oct. 16, 2017 (KR) .......... 10-2017-0133772
Oct. 16, 2018 (KR) .......... 10-2018-0122935

(51) Int. Cl.
*H01M 4/134* (2010.01)
*H01M 4/36* (2006.01)
(Continued)

(52) U.S. Cl.
CPC .......... *H01M 4/134* (2013.01); *H01M 4/366* (2013.01); *H01M 4/382* (2013.01); *H01M 4/628* (2013.01);
(Continued)

(58) Field of Classification Search
CPC .............................. H01M 4/366; H01M 4/134
See application file for complete search history.

(56) References Cited

U.S. PATENT DOCUMENTS 6,214,061 B1    4/2001   Visco et al.
6,911,280 B1    6/2005   De Jonghe et al.
(Continued)

FOREIGN PATENT DOCUMENTS

CN    103560164 A    2/2014
CN    104617328 A    5/2015
(Continued)

OTHER PUBLICATIONS

Partial Supplementary European Search Report for European Application No. 18868689.3, dated Oct. 14, 2020.
(Continued)

*Primary Examiner* — Stephan J Essex
(74) *Attorney, Agent, or Firm* — Birch, Stewart, Kolasch & Birch, LLP

(57) ABSTRACT

A lithium electrode and a lithium secondary battery including the same. More particularly, in the preparation of the lithium electrode, a protective layer for protecting the lithium metal is formed on the substrate, lithium metal may be deposited on the protective layer and then transferred to at least one side of the current collector to form a lithium electrode having a thin and uniform thickness, and the energy density of the lithium secondary battery using the lithium electrode thus manufactured may be improved.

13 Claims, 5 Drawing Sheets

(51) Int. Cl.

| | |
|---|---|
| *H01M 4/38* | (2006.01) |
| *H01M 4/62* | (2006.01) |
| *H01M 4/66* | (2006.01) |
| *H01M 10/052* | (2010.01) |
| *H01M 4/02* | (2006.01) |

(52) U.S. Cl.
CPC ........... *H01M 4/661* (2013.01); *H01M 4/663* (2013.01); *H01M 4/667* (2013.01); *H01M 10/052* (2013.01); *H01M 2004/021* (2013.01)

(56) References Cited

U.S. PATENT DOCUMENTS

| | | | |
|---|---|---|---|
| 2002/0012846 A1 | 1/2002 | Skotheim et al. | |
| 2002/0061445 A1* | 5/2002 | Kitagawa | H01M 4/133 429/231.8 |
| 2003/0088971 A1* | 5/2003 | Visco | H01M 4/134 29/623.1 |
| 2003/0129497 A1 | 7/2003 | Yamamoto et al. | |
| 2005/0008938 A1 | 1/2005 | Cho et al. | |
| 2005/0079420 A1 | 4/2005 | Cho et al. | |
| 2010/0055564 A1* | 3/2010 | Tokunaga | H01M 10/0587 429/209 |
| 2010/0086851 A1 | 4/2010 | Wang et al. | |
| 2010/0221611 A1 | 9/2010 | Menke et al. | |
| 2010/0330430 A1* | 12/2010 | Chung | H01M 4/386 429/224 |
| 2013/0017441 A1* | 1/2013 | Affinito | H01M 4/628 429/211 |
| 2014/0272565 A1 | 9/2014 | Gronwald et al. | |
| 2014/0272594 A1* | 9/2014 | Safont Sempere | H01M 4/134 429/231.95 |
| 2016/0149212 A1* | 5/2016 | Zaghib | H01M 4/0404 429/231.95 |
| 2016/0380314 A1 | 12/2016 | Yang et al. | |
| 2017/0062829 A1 | 3/2017 | Ryu et al. | |
| 2018/0051137 A1 | 2/2018 | Kim et al. | |

FOREIGN PATENT DOCUMENTS

| | | |
|---|---|---|
| CN | 103560162 B | 2/2017 |
| JP | 2007-109423 A | 4/2007 |
| JP | 3982230 B2 | 9/2007 |
| JP | 2007-273459 A | 10/2007 |
| JP | 2013-20974 A | 1/2013 |
| JP | 5269692 B2 | 8/2013 |
| JP | 2014-44921 A | 3/2014 |
| JP | 2014-205731 A | 10/2014 |
| JP | 2015-46220 A | 3/2015 |
| JP | 6005938 B2 | 10/2016 |
| KR | 10-2005-0019483 A | 3/2005 |
| KR | 10-0497231 B1 | 6/2005 |
| KR | 10-0635684 B1 | 10/2006 |
| KR | 10-2011-0017214 A | 2/2011 |
| KR | 10-2015-0101808 A | 9/2015 |
| KR | 10-2015-0132427 A | 11/2015 |
| KR | 10-2016-0037488 A | 4/2016 |
| KR | 10-2016-0037610 A | 4/2016 |
| KR | 10-2016-0052351 A | 5/2016 |
| KR | 10-2017-0001069 A | 1/2017 |
| KR | 10-2017-0026098 A | 3/2017 |
| KR | 10-2017-0036481 A | 4/2017 |
| KR | 10-2017-0086002 A | 7/2017 |
| WO | WO 2017/104867 A1 | 6/2017 |
| WO | WO 2017/131997 A1 | 8/2017 |

OTHER PUBLICATIONS

International Search Report for PCT/KR2018/012151 (PCT/ISA/210) dated Apr. 10, 2019.
Extended European Search Report, dated Feb. 21, 2021, for European Application No. 18868689.3.
Jeong et al., "Multifunctional $TiO_2$ Coating for a SiO Anode in Li-ion Batteries," Journal of Materials Chemistry, vol. 22, No. 16, 2012 (Jan. 1, 2012), pp. 7999-8004, XP055772461.
Woo et al., "A Comparative Investigation of Different Chemical Treatments on SiO Anode Materials for Lithium-Ion Batteries: Towards Long-Term Stability," RSC Advances, vol. 7, No. 8. Published on Jan. 17, 2017 (Jan. 1, 2017), pp. 4501-4509, XP055772487.

* cited by examiner

[Figure 1]
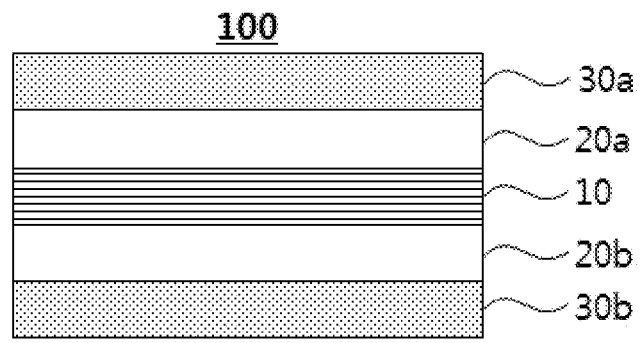
[Figure 2]
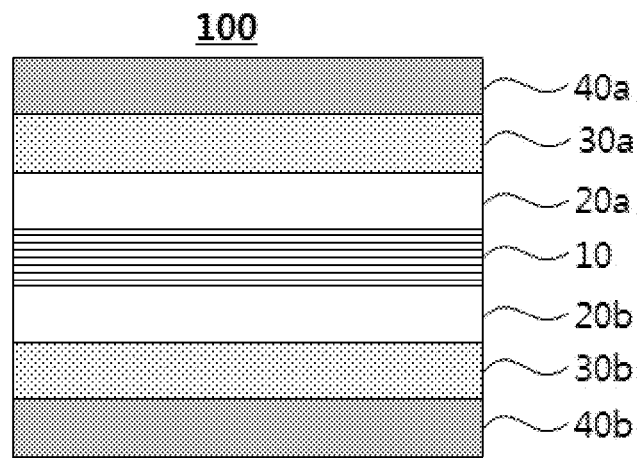

[Figure 3]
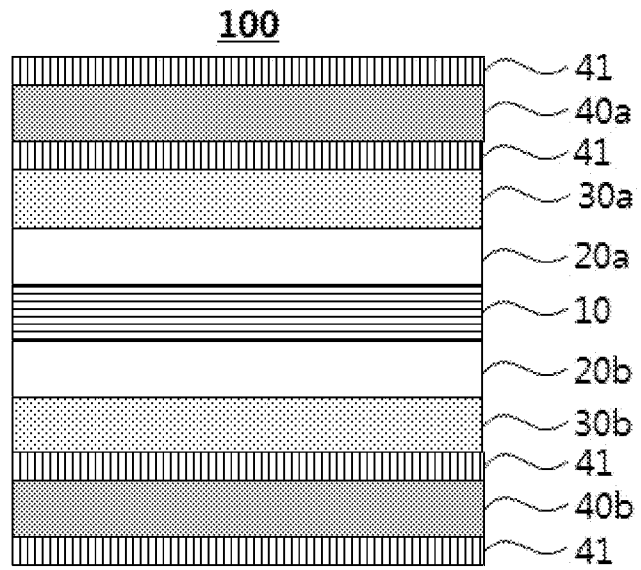
[Figure 4]
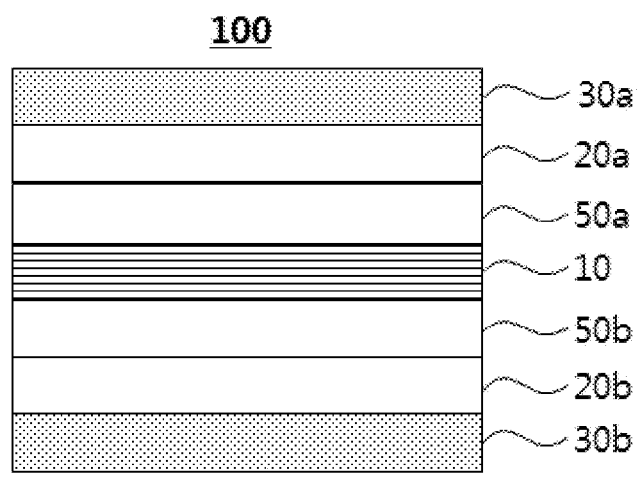

[Figure 5]
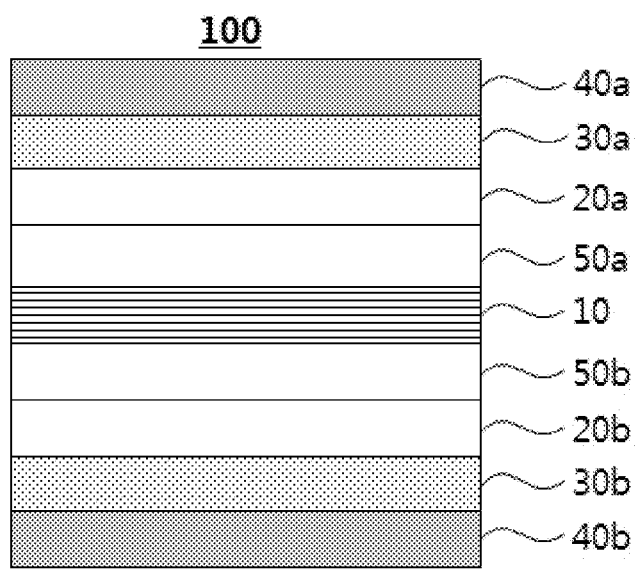

[Figure 6]
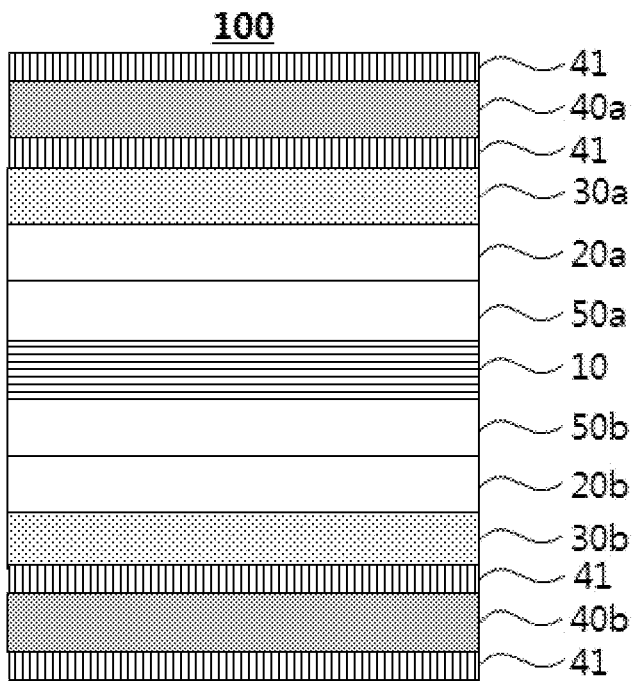
[Figure 7]
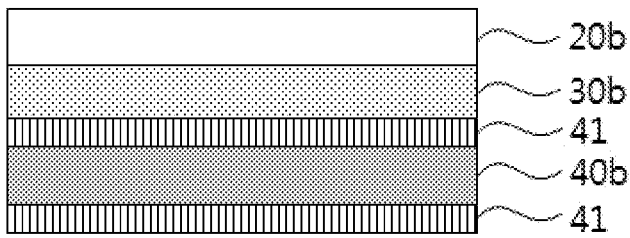
[Figure 8]
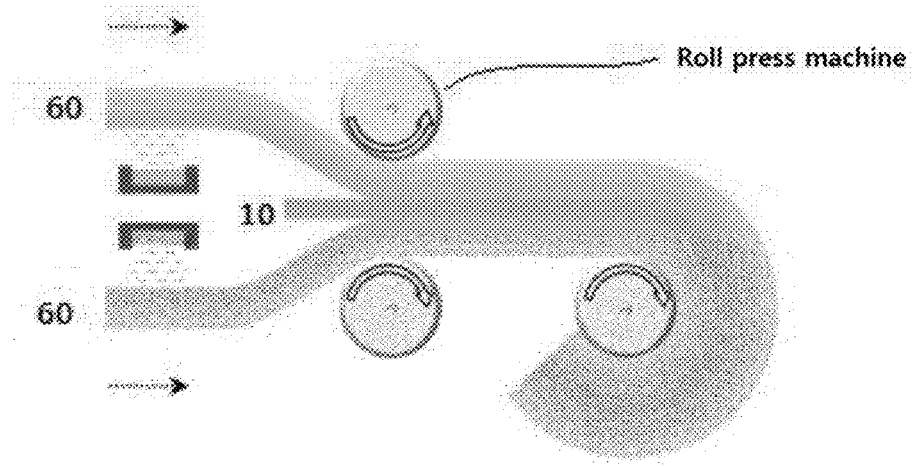

[Figure 9]
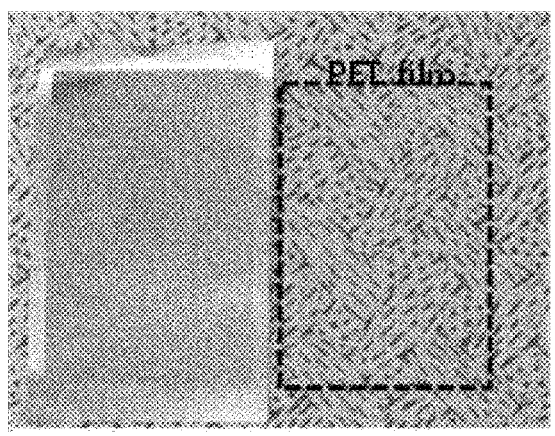
[Figure 10]
 

LITHIUM ELECTRODE AND LITHIUM SECONDARY BATTERY COMPRISING SAME

TECHNICAL FIELD

The present application claims the benefits of Korean Patent Application No. 10-2017-0133772 filed on Oct. 16, 2017 and Korean Patent Application No. 10-2018-0122935 filed on Oct. 16, 2018, all the contents of which are incorporated herein by reference.

The present invention relates to a lithium electrode containing a lithium metal layer capable of improving the energy density of a battery by having a uniform thin film shape and a lithium secondary battery comprising the lithium electrode.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high capacity characteristics, lithium metal has attracted much attention as a negative electrode active material for electrochemical batteries. Lithium metal negative electrode, or negative electrodes, which mainly comprise lithium metal, provide the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Conventional lithium ion batteries have an energy density of 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to more than 500 km, an increase in energy density is required.

In order to increase the energy density of the lithium ion battery, the use of lithium electrode is increasing. However, there is a problem that lithium metal is difficult to handle in process because it is highly reactive and difficult to handle.

An existing lithium electrode with lithium metal as a raw material was manufactured by depositing lithium directly on the Cu foil corresponding to the current collector. This method of directly depositing lithium metal on the current collector has an advantage that the process is simple and efficient, but it is not easy to manufacture a real lithium electrode due to the following two reasons.

First, the Cu foil has a thickness of 10 μm, and the thickness is gradually getting thinner in order to increase the volume energy density (the energy per unit volume of the battery). In recent years, the Cu foil having a thickness of 6 μm has also been used for mass production. However, the Cu foil of such a thin film is difficult to handle, and as the thickness of the Cu foil becomes thin, there is a great risk of fracture, and there is a high possibility that the Cu foil will cause folding or wrinkling during driving.

Second, in order to manufacture a pouch-type cell, since lithium must be deposited on both sides of the Cu foil, the process should be proceeded in the order of first depositing lithium on one side of the Cu foil and then depositing lithium on the opposite side in the process. However, in these cases, although the deposition conditions of the two evaporators are the same, when considering the sensitivity of the deposition process, it is difficult to equalize the morphologies of lithium deposited on both sides of the Cu foil and battery performance. In addition, since the first deposited lithium has to undergo another heating step at the time of the second deposition, lithium on both sides cannot be said to be deposited under the same conditions.

Korean Patent Registration No. 2011-0017214 relates to a lithium metal capacitor of an energy storage device and describes that a lithium thin film can be formed on both sides of a current collector. However, since the lithium thin film is formed by deposition, there are problems that the morphologies of lithium deposited on both sides of the current collector cannot be the same and the battery performance will be adversely affected as mentioned above.

Therefore, there is a continuing need to develop a technique for manufacturing lithium electrodes having a thin and uniform thickness, which can be manufactured by a method for preventing the degradation phenomenon of the physical properties of lithium by the process conditions of the lithium electrode and can minimize the formation of the oxide layers by protecting lithium from moisture and outside air during the manufacturing process.

PRIOR ART DOCUMENT (Patent Document 1) Korean Patent Laid-open Publication No. 2011-0017214, "Lithium metal capacitor of Energy storage device and manufacturing method therefor".

(Patent Document 2) Japanese Patent Registration No. 6005938, "Electrode composition and method".

DISCLOSURE

Technical Problem

As a result of various studies to solve the above problems, one embodiment of the present invention relates to a lithium electrode having a thin and uniform thickness which can be manufactured by first forming, when manufacturing a lithium electrode, a protective layer capable of protecting lithium metal on the substrate, and depositing lithium metal on the protective layer and then transferring it to the Cu current collector, and the energy density of the lithium secondary battery using the lithium electrode thus prepared is improved.

Therefore, one embodiment of the present invention is to provide a lithium electrode having a thin and uniform thickness by minimizing the formation of an oxide layer due to the production by the transfer process.

Another embodiment of the present invention is to provide a lithium secondary battery comprising the lithium electrode having the thin and uniform thickness.

Technical Solution

In order to achieve the above objects, the present invention provides a lithium electrode comprising a current collector; a lithium metal layer on at least one side of the current collector; and a protective layer on the lithium metal layer.

The lithium electrode may further comprise an SiO coating layer between the current collector and the lithium metal layer.

The SiO coating layer may be a mixed coating layer including SiO and graphite.

The SiO and graphite may be mixed in a weight ratio of 1:1 to 1:9.

The current collector may be selected from the group consisting of copper, aluminum, nickel, titanium, sintered carbon, aluminum-cadmium allow, and stainless steel. The stainless steel may be surface treated with carbon, nickel, titanium, or silver.

The thickness of the lithium metal layer may be 1 to 50 µm.

The protective layer may comprise at least one selected from the group consisting of poly vinylidene fluoride (PVDF), poly vinylidene fluoride-hexafluoroethylne copolymer (PVDF-HFP copolymer), cyclo olefin polymer, cyclo olefin copolymer and styrene butadiene rubber-carboxymethyl cellulose (SBR-CMC).

The lithium electrode may further comprise a substrate formed on the protective layer.

The substrate may have a release layer formed on at least one side thereof.

The release layer may comprise at least one selected from the group consisting of Si, melamine, and fluorine. The release layer may comprise at least one selected from the group consisting of a silicone-based resin, a melamine-based resin and a fluorine-based resin.

The substrate may comprise at least one selected from the group consisting of polyethylene terephthalate (PET), polyimide (PI), poly(methylmethacrylate) (PMMA), cellulose tri-acetate (TAC), polypropylene, polyethylene and polycarbonate.

The present invention also provides a lithium electrode comprising a current collector; a lithiated SiO coating layer formed on at least one side of the current collector; and a protective layer formed on the lithiated SiO coating layer.

Advantageous Effects

The lithium electrode according to the present invention has the protective layer formed on the lithium metal layer and thus may protect lithium from outside air and moisture.

Also, the present invention may manufacture the lithium electrode in which the current collector, the lithium metal layer, and the lithium metal protective layer are sequentially stacked by depositing lithium metal on the lithium metal protective layer and then transferring lithium metal onto the current collector and thus may prevent deterioration of the physical properties of lithium metal due to deposition process conditions.

Also, the lithium electrode according to the present invention may have a thin and uniform thickness by protecting the lithium metal from exposure to external environments such as moisture or outside air during the manufacturing process by the protective layer and thus minimizing the formation of an oxide layer (native layer) on the surface of lithium metal.

Also, since a method of forming the lithium metal layer on the current collector by transfer without directly depositing lithium metal on the current collector is used, it is possible to compensate for the problem of the current collector that is liable to break during the deposition process and thus it is possible to manufacture lithium electrodes using various types of current collectors.

DESCRIPTION OF DRAWINGS

FIG. 1 is a schematic view showing a cross section of the lithium electrode according to a first preferred embodiment of the present invention.

FIG. 2 is a schematic view showing a cross section of the lithium electrode according to a second preferred embodiment of the present invention.

FIG. 3 is a schematic view showing a cross section of the lithium electrode according to a third preferred embodiment of the present invention.

FIG. 4 is a schematic view showing a cross section of the lithium electrode according to a fourth preferred embodiment of the present invention.

FIG. 5 is a schematic view showing a cross section of the lithium electrode according to a fifth preferred embodiment of the present invention.

FIG. 6 is a schematic view showing a cross section of the lithium electrode according to a sixth preferred embodiment of the present invention.

FIG. 7 is a schematic view showing the lithium electrode laminate before transfer to the current collector during the manufacturing process of the lithium electrode according to the present invention.

FIG. 8 is a schematic view showing the manufacturing process of the lithium electrode according to Example 1.

FIG. 9 is a photograph showing the lithium electrode manufactured in Example 1.

FIG. 10 is a photograph showing the lithium electrode manufactured in Comparative Example 1.

BEST MODE

Hereinafter, the present invention will be described in detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Hereinafter, the structure of the lithium electrode according to the present invention will be described in detail with reference to the drawings.

Lithium Electrode (1)

The present invention relates to a lithium electrode capable of increasing the energy density of a battery.

FIG. 1 is a schematic view showing a cross section of the lithium electrode according to a first preferred embodiment of the present invention.

Referring to FIG. 1, the lithium electrode 100 may have lithium metal layers 10a and 10b formed on both sides of the current collector 10 and protective layers 20a and 20b formed on the lithium metal layers 10a and 10b. FIG. 1 shows an example where lithium metal layers 10a and 10b are formed on both sides of the current collector 10, but the present invention is not limited thereto, and the lithium metal layer may be also formed on one side of the current collector.

In the present invention, the current collector 10 may be a variety of current collectors selected from the group consisting of copper (Cu), aluminum (Al), nickel (Ni), titanium (Ti), sintered carbon and stainless steel (SUS).

The current collector 10 may have a thickness of 1 to 10 µm, preferably 1 to 8 µm, more preferably 1 to 6 µm. If the thickness of the current collector 10 is less than the above range, the durability of the electrode may be deteriorated. If the thickness of the current collector 10 exceeds the above range, the thickness of the electrode may be thickened.

In the present invention, the lithium metal layers 10a and 10b are formed on both sides of the current collector 10, and the lithium metal layers 10a and 10b are formed on both sides of the current collector 10 by the transfer process, but not by deposition, which is carried out in accordance with a method as described below, and thus it is possible to form thin and uniform lithium metal layers 10a and 10b.

In addition, since the lithium metal layers 10a and 10b formed on both sides of the current collector 10 are formed and then transferred by the process under the same condition, the two lithium metal layers 10a and 10b may have the same shape and physical properties.

The lithium metal layers 10a and 10b may each have a thickness of 1 to 50 μm, preferably 5 to 40 μm, more preferably 10 to 30 μm. If the thickness is less than the above range, the charging and discharging performance of the battery may be deteriorated. If the thickness is less than the above range, the thickness of the electrode may be increased.

In a typical lithium secondary battery, since the amount of lithium contained in the positive electrode is all of the lithium, its capacity is limited. However, in the case of the battery comprising the lithium electrode according to the present invention as a negative electrode, the negative electrode as well as the positive electrode contains lithium, and lithium ions may be supplied from such lithium, so that an additional increase of capacity may be expected. If the thickness of the lithium metal layer in the lithium negative electrode is thick, the increase in capacity will be greater. However, considering the economic efficiency and handling property, the lithium metal layer having the thickness in the numerical range as described above is preferable.

Meanwhile, when the lithium metal layer is used for irreversible compensation of the SiO coating layer as described below, the lithium metal layer may have a thickness of 1 to 10 μm. Since lithium is used only for the irreversible compensation of the SiO coating layer irrespective of the increase in the capacity of the battery, the thickness of the lithium metal layer does not need to be thick.

In the present invention, the protective 30a and 30b may protect the lithium metal from external environment such as moisture or outside air to minimize the formation of oxide film (native layer) on the surface in a series of processes for manufacturing the lithium electrode 100 and during the driving process of the lithium electrode 100.

Therefore, the material for forming the protective layers 30a and 30b should have high moisture barrier properties, stability to the electrolyte, high electrolyte wettability, and excellent oxidation/reduction stability.

The protective layers 30a and 30b may comprise at least one selected from the group consisting of poly vinylidene fluoride (PVDF), poly vinylidene fluoride-hexafluoroethylne copolymer (PVDF-HFP copolymer), cyclo olefin polymer, cyclo olefin copolymer and styrene butadiene rubber-carboxymethyl cellulose (SBR-CMC).

The thicknesses of the protective layers 30a and 30b may each be 0.1 μm to 1.0 μm, preferably 0.3 μm to 0.8 μm, more preferably 0.4 μm to 0.6 μm. If the thickness of the protective layer 30a or 30b is less than the above range, the function of protecting the lithium metal from moisture or outside air may be deteriorated. If the thickness exceeds the above range, the lithium electrode 100 may be thickened.

FIG. 2 is a schematic view showing a cross section of the lithium electrode according to a second preferred embodiment of the present invention.

Referring to FIG. 2, the lithium electrode 100 may have substrates 40a and 40b formed on protective layers 30a and 30b, respectively, as shown in FIG. 1.

In the present invention, the substrates 40a and 40b may function to protect the lithium metal layers 20a and 20b from moisture and outside air in common with the protective layers 30a and 30b. The substrates 40a and 40b are stripped and discarded before the lithium electrode 100 is put into the battery manufacturing process and laminated with the separator and the positive electrode. The lithium electrode 100 in a state of comprising the substrates 40a and 40b is also referred to as a lithium electrode 100 in a semi-finished state.

The substrates 40a and 40b may comprise at least one selected from the group consisting of polyethylene terephthalate (PET), polyimide (PI), poly(methylmethacrylate) (PMMA), cellulose tri-acetate (TAC), polypropylene, polyethylene and polycarbonate.

The substrates 40a and 40b may each have a thickness of 5 to 100 μm, preferably 5 to 50 μm, and more preferably 5 to 25 μm. The thicknesses of the substrates 40a and 40b are optimized in consideration of the function of protecting the lithium metal layers 10a and 10b from moisture and outside air, and the rapid heat transfer and productivity. The smaller the thickness within the above range, the more advantageous it can be.

FIG. 3 is a schematic view showing a cross section of the lithium electrode according to a third preferred embodiment of the present invention.

Referring to FIG. 3, the release layer 41 may be formed on one side (not shown) or on both sides of the substrates 40a and 40b in the lithium electrode 100 as shown in FIG. 2.

In the present invention, the release layer 41 may facilitate the delamination of the substrates 40a and 40b when the lithium electrode 100 is put into a battery manufacturing process.

The release layer 41 may comprise at least one selected from the group consisting of a silicone-based resin, a melamine-based resin and a fluorine-based resin. It may be preferable to use the silicone-based resin in terms of cost and commercialization.

The thickness of the release layer 41 may be formed in a suitable thickness within a range that does not cause physical damage to the protective layers 30a and 30b when the substrates 40a and 40b are delaminated.

FIG. 4 is a schematic view showing a cross section of the lithium electrode according to a fourth preferred embodiment of the present invention.

Referring to FIG. 4, the lithium electrode 100 may further comprise SiO coating layers 50a and 50b formed between the current collector 10 and the lithium metal layers 20a and 20b as shown in FIG. 1.

In the present invention, the SiO coating layers 50a and 50b may increase the capacity of the lithium electrode 100. When only the SiO coating layers 50a and 50b are present, a large irreversible phenomenon may occur during the initial discharging, but it is possible to prevent the occurrence of a large irreversible phenomenon during the initial discharging and at the same time to increase the capacity of the lithium electrode 100 by manufacturing the lithium electrode 100 having the structure obtained by forming the lithium metal layers 20a and 20b on the SiO coating layers 50a and 50b.

The SiO coating layers 50a and 50b may be a mixed coating layer of SiO and graphite, and SiO and graphite may be mixed in a weight ratio of 1:1 to 1:9. If the weight ratio of graphite to SiO is less than 1:1, the capacity increase effect of the lithium electrode 100 may be insignificant. If the weight ratio is more than 1:9, an irreversible phenomenon may occur.

The SiO coating layers 50a and 50b may each have a thickness of 60 to 120 μm, preferably 65 to 100 μm, and more preferably 70 to 90 μm. If the thickness is less than the above range, the capacity of the electrode may be lowered. If the thickness exceeds the above range, irreversible compensation of SiO by lithium may not be completely achieved.

FIG. 5 is a schematic view showing a cross section of the lithium electrode according to a fifth preferred embodiment of the present invention.

Referring to FIG. 5, the lithium electrode 100 may have the substrates 40a and 40b formed on the protective layers 20a and 20b, respectively, as shown in FIG. 4.

The roles, the constituent materials, and the thicknesses of the substrates 40a and 40b are the same as those described in FIG. 2.

FIG. 6 is a schematic view showing a cross section of the lithium electrode according to a sixth preferred embodiment of the present invention.

Referring to FIG. 6, the release layer 41 may be formed on one side (not shown) or on both sides of the substrates 40a and 40b in the lithium electrode 100 as shown in FIG. 5.

The roles, the constituent materials, and the thicknesses of the release layer 41 are the same as those described in FIG. 3.

Lithium Electrode (2)

The present invention also relates to a lithium electrode comprising a current collector; lithiated SiO coating layers formed on both sides of the current collector; and protective layers formed respectively on the lithiated SiO coating layers.

In the lithium electrode, the type and shape of the current collector, protective layer, release layer and substrate are the same as described above.

In the present invention, the lithiated SiO coating layer means that after the SiO coating layer is formed between the current collector and the lithium metal layer, lithium is melted into the SiO coating layer by solid-solid reaction to form a lithiated SiO coating layer. At this time, the lithium metal layer is completely disappeared.

The lithiated SiO coating layer may have a thickness of 60 to 120 μm, preferably 65 to 100 μm, more preferably 70 to 90 μm. If the thickness is less than the above range, the capacity of the electrode may be lowered. If the thickness exceeds the above range, irreversible compensation of SiO by lithium may not be completely achieved.

Method of Manufacturing Lithium Electrode

The present invention also relates to a method of manufacturing a lithium electrode capable of increasing the energy density of a battery, comprising the steps of: (S1) forming a protective layer by coating a polymer for protecting lithium metal on the substrate; (S2) depositing lithium metal on the protective layer to form a lithium metal layer; and (S3) transferring the lithium metal layer to at least one side of the current collector.

FIG. 7 is a schematic view showing the lithium electrode laminate before transfer to the current collector during the manufacturing process of the lithium electrode according to the present invention.

Referring to FIG. 7, the lithium electrode is formed by sequentially forming protective layers 30a and 30b and lithium metal layers 20a and 20b on the substrates 40a and 40b having the release layers 41 formed on both sides thereof and then transferring them to a current collector (not shown).

Hereinafter, the present invention will be described in more detail for each step.

Step (S1)

In step (S1), a polymer for protecting lithium metal may be coated on the substrate to form a protective layer for protecting lithium metal.

The substrate may be a material having characteristics that may withstand the process conditions such as high temperature in the step of depositing lithium metal, and may prevent the reverse delamination problem in which the lithium metal layer is transferred onto the substrate rather than the current collector during the winding process for transferring the deposited lithium metal layer to the current collector.

For example, the substrate may be at least one selected from the group consisting of polyethylene terephthalate (PET), polyimide (PI), poly(methylmethacrylate) (PMMA), cellulose tri-acetate (TAC), polypropylene, polyethylene and polycarbonate.

In addition, the substrate may have a release layer formed on at least one side thereof, preferably release layers formed on both sides thereof. The problem of inverse delamination in which the lithium metal layer is transferred onto the substrate rather than the current collector may be prevented by the release layer during the winding process for transferring the deposited lithium metal layer to the current collector, and also the substrate may be easily separated after the lithium metal layer is transferred onto the current collector.

The release layer may comprise at least one selected from the group consisting of a silicone-based resin, a melamine-based resin and a fluorine-based resin.

The release layer may be formed by a coating method. For example, the coating method may be, but is not limited to, a method selected from the group consisting of dip coating, spray coating, spin coating, die coating, and roll coating, but a variety of coating methods that may be used to form a coating layer in the art can be used.

Step (S2)

In step (S2), lithium metal may be deposited on the protective layer to form a lithium metal layer.

In the present invention, the protective layer may protect the lithium metal from external environment such as moisture or outside air to minimize the formation of oxide film (native layer) on the surface in a series of processes for manufacturing the lithium electrode.

Therefore, the material for forming the protective layer should have high moisture barrier properties, stability to the electrolyte, high electrolyte wettability, and excellent oxidation/reduction stability.

For example, the protective layer may comprise at least one selected from the group consisting of poly vinylidene fluoride (PVDF), poly vinylidene fluoride-hexafluoroethylne copolymer (PVDF-HFP copolymer), cyclo olefin polymer, cyclo olefin copolymer and styrene butadiene rubber-carboxymethyl cellulose (SBR-CMC).

The thickness of the protective layer may be 0.1 μm to 1.0 μm, preferably 0.3 μm to 0.8 μm, more preferably 0.4 μm to 0.6 μm. If the thickness of the protective layer is less than the above range, the function of protecting the lithium metal from moisture or outside air may be deteriorated. If the thickness exceeds the above range, the lithium electrode may be thickened.

The coating solution for forming the protective layer may be prepared by dissolving the polymer as described above in a solvent. At this time, the concentration of the coating solution may be 1% to 20%, preferably 3% to 10%, more preferably 4% to 8%. If the concentration of the coating solution is less than the above range, the viscosity is very low and thus the coating process is difficult to proceed. If the concentration of the coating solution exceeds the above range, the viscosity may be high and it may be difficult to form a coating layer with a desired coating thickness. At this time, examples of the solvent for forming the coating solution may be at least one selected from the group consisting of N-methyl-2-pyrrolidone (NMP), dimethyl formamide (DMF), dimethyl acetamide (DMAc), tetramethyl urea, dimethyl sulfoxide (DMSO) and triethyl phosphate. In particular, when NMP is used, the solubility of the polymer for forming the protective layer is high as described above, and it may be advantageous to form the protective layer by the coating process.

In addition, examples of the coating method for forming the protective layer may be, but is not limited to, a method selected from the group consisting of dip coating, spray coating, spin coating, die coating, roll coating, Slot-die coating, Bar coating, Gravure coating, Comma coating, Curtain coating and Micro-Gravure coating, but a variety of coating methods that may be used to form a coating layer in the art can be used.

In the present invention, the lithium metal layer formed on the protective layer by deposition may have a thickness of 1 to 50 μm, preferably 5 to 40 μm, more preferably 10 to 30 μm. The thickness of the lithium metal layer may be varied depending on the application. When only lithium metal is used as the electrode material, for example, as a negative electrode material, the thickness of the lithium metal layer is sufficient if it is in the range of 20 to 25 μm, but when lithium metal is used as a material to compensate for the irreversible phenomenon occurring in the negative electrode of the silicon oxide material, the thickness of the lithium metal layer may be about 1 to 12 μm. If the thickness of the lithium metal layer is less than the above range, the capacity and life characteristics of the battery may be deteriorated. If the thickness of the lithium metal layer exceeds the above range, the thickness of the lithium electrode to be manufactured may be thickened, which may be detrimental to commercialization.

In the present invention, examples of the deposition method for depositing the lithium metal may be, but is not limited to, a method selected from the group consisting of evaporation deposition, chemical vapor deposition (CVD), and physical vapor deposition, but a variety of deposition methods that is used in the art can be used.

Step (S3)

In step (S3), the lithium metal layer may be transferred to a current collector. At this time, after winding the structure in which the substrate, the protective layer and the lithium metal layer are sequentially stacked, the transfer may be performed such that the lithium metal layer is transferred onto the current collector using a device such as a roll press.

In the present invention, the current collector may be one selected from the group consisting of copper, aluminum, nickel, titanium, sintered carbon, and stainless steel.

When a lithium metal is directly deposited on a current collector, in particular, when lithium metal is directly deposited on a copper current collector, there is a problem that the copper current collector is easily broken. However, for the present invention, since the lithium metal layer is formed and then the lithium metal layer itself is transferred to the current collector to manufacture the lithium electrode, the lithium electrode may be manufactured using various current collectors.

In addition, both sides of the current collector may be coated with an SiO coating layer. The role, constituent material and thickness of the SiO coating layer are as described above.

The SiO coating layer may be formed by dissolving a mixture of SiO and graphite in an organic solvent such as ethanol by 0.5 to 2 M concentration to form a coating solution and then coating the coating solution on at least one side of the current collector.

The SiO coating layer may be formed by a coating method. For example, the coating method may be, but is not limited to, a method selected from the group consisting of dip coating, spray coating, spin coating, die coating, and roll coating, but a variety of coating methods that may be used to form a coating layer in the art can be used.

Meanwhile, after the SiO coating layer is formed, lithium is melted into the SiO coating layer by solid-solid reaction to form a lithiated SiO coating layer, and the lithium metal layer is completely disappeared.

According to the manufacturing method of the lithium electrode as described above, a method of depositing lithium metal on a lithium metal protective layer and transferring it to a current collector is used in order to manufacture the lithium electrode, and a lithium electrode in which a current collector, a lithium metal layer, and a protective layer are sequentially stacked may be manufactured.

In addition, the lithium electrode with a thin and uniform thickness may be manufactured by protecting the lithium metal from exposure to external environments such as moisture or outside air during the manufacturing process by the protective layer and thus minimizing the formation of an oxide layer (native layer) on the surface of lithium metal.

In addition, since a method of forming a lithium metal layer on the current collector by transfer without depositing lithium metal directly on the current collector is used, it is possible to compensate for the problem of the current collector which is liable to break during the deposition process and thus the lithium electrode may be manufactured using various kind of current collectors.

Lithium Secondary Battery

The present invention relates to a lithium secondary battery comprising the lithium electrode as described above.

In the lithium secondary battery according to the present invention, the lithium electrode may be used as a negative electrode, and the lithium secondary battery may comprise a lithium negative electrode, an electrolyte solution, a separator, and a positive electrode. As the electrolyte solution, the separator, and the positive electrode, those conventionally used in the art can be widely used.

For the positive electrode, a lithium-containing transition metal oxide may be preferably used as the positive electrode active material. For example, the positive electrode active material may be any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a mixture of two or more thereof. The lithium-containing transition metal oxide may be coated with a metal such as aluminum (Al) or a metal oxide. In addition to the lithium-containing transition metal oxide, sulfide, selenide, halide and the like may also be used.

For the separator, in order to improve the mechanical strength and to improve the safety of the lithium secondary battery, the porous polymer substrate may further comprise, on at least one side thereof, a porous coating layer containing inorganic particles and a polymer binder. In this case, the inorganic particles are not particularly limited as long as they are electrochemically stable. That is, the inorganic particles that may be used in the present invention are not particularly limited as long as oxidation and/or reduction reaction does not occur in a range of the applied operating voltage of the lithium secondary battery (for example, 0 to 5 V based on $Li/Li^+$). Particularly, when inorganic particles having a high dielectric constant are used as the inorganic particles, such inorganic particles may contribute to an increase in the dissociation of the electrolyte salts in the liquid electrolyte, such as lithium salts, thereby improving the ion conductivity of the electrolyte.

In that case, the polymer binder may be, but is not limited to, any one selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or a mixture of two or more thereof.

In the porous coating layer, the polymer binder is coated on part or all of the surface of the inorganic particles, the inorganic particles are connected and fixed to each other by the polymer binder in an adhered state, an interstitial volume is formed between the inorganic particles, and the interstitial volume between the inorganic particles is preferably an empty space to form pores. These void spaces become pores of the porous coating layer, and it is preferable that these pores are equal to or smaller than the average particle diameter of the inorganic particles.

In the present invention, the electrolyte solution may comprise a non-aqueous solvent and an electrolyte salt.

The non-aqueous solvent is not particularly limited as long as it is used as a non-aqueous solvent for a non-aqueous electrolyte solution. A cyclic carbonate, a linear carbonate, a lactone, an ether, an ester, or a ketone may be used.

Examples of the cyclic carbonate comprise ethylene carbonate (EC), propylene carbonate (PC), butylene carbonate (BC) and the like, and examples of the linear carbonate comprise diethyl carbonate (DEC), dimethyl carbonate (DMC), dipropyl carbonate (DPC), ethylmethylcarbonate (EMC), methyl propyl carbonate (MPC) and the like. Examples of the lactone comprise gamma butyrolactone (GBL), and examples of the ether comprise dibutyl ether, tetrahydrofuran, 2-methyl tetrahydrofuran, 1,4-dioxane, 1,2-dimethoxyethane and the like. Also, examples of the esters comprise n-methyl acetate, n-ethyl acetate, methyl propionate, methyl pivalate and the like. The ketone comprises poly methyl vinyl ketone. These non-aqueous solvents may be used alone or in admixture of two or more.

The electrolyte salt is not particularly limited as long as it is usually used as an electrolyte salt for a non-aqueous electrolyte solution. A non-limiting example of an electrolyte salt is a salt of the structure like $A^+B^-$ wherein $A^+$ comprises ions consisting of alkali metal cations such as $Li^+$, $Na^+$, and $K^+$, or combinations thereof and $B^-$ comprises ions consisting of anions such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, and $C(CF_2SO_2)_3^-$ or combinations thereof. In particular, lithium salts are preferred. These electrolyte salts may be used alone or in combination of two or more.

The injection of the non-aqueous electrolyte solution may be performed at an appropriate stage depending on the manufacturing process and the required properties of the final product during the manufacturing process of the lithium secondary battery. That is, the injection may be applied before the assembly of the lithium secondary battery or at the final stage of the assembly of the lithium secondary battery.

The outer shape of the lithium secondary battery according to an embodiment of the present invention comprising the electrode assembly thus obtained is not particularly limited, but may be a cylindrical shape using a can, a square shape, a pouch shape, a coin shape, or the like.

In particular, the lithium electrode according to the present invention has a thin thickness and excellent thickness uniformity, and thus may significantly improve the energy density when applied to a lithium secondary battery.

Hereinafter, preferred examples of the present invention will be described in order to facilitate understanding of the present invention. It will be apparent to those skilled in the art, however, that the following examples are illustrative of the present invention and that various changes and modifications may be made within the scope and spirit of the present invention. Such variations and modifications are within the scope of the appended claims.

Example 1: Manufacture of Lithium Electrode

A release PET film (SKC Haas, RX12G 50 μm) having a release layer on both sides was prepared as a substrate.

A PVDF-HFP coating solution was prepared as a coating solution for forming a protective layer for protecting lithium metal on one side of the substrate. The PVDF-HFP coating solution was prepared by dissolving PVDF-HFP (Arkema, LBG Grade) in NMP solvent to be a 5% solution.

The PVDF-HFP coating solution was coated on one side of the release PET film by 0.2 μm in thickness using a Micro-Gravure coater to form a PVDF-HFP protective layer.

Lithium metal was deposited on the protective layer by evaporation deposition at a temperature of 600° C. to form a lithium metal layer having a thickness of 20 μm, and a structure, in which the above-mentioned release PET film, the PVDF-HFP protective layer and the lithium metal layer were sequentially stacked, was wound at a speed of 1 m/min. Two stacked structures thus obtained were prepared.

Thereafter, the lithium metal layer was transferred to both sides of the Cu current collector using a roll press machine (Calendering machine CLP-1015, CIS), and thus a laminated lithium electrode obtained by sequentially forming the lithium metal layer and the PVDF-HFP protective layer on both sides of the Cu current collector was prepared.

FIG. 8 is a schematic view showing the manufacturing process of the lithium electrode according to Example 1.

Referring to FIG. 8, the lithium electrode may be manufactured by transferring the two stacked structures 60 prepared as described above to both sides of the current collector 10.

Example 2: Manufacture of Lithium Electrode

A PVDF protective layer was formed in the same manner as in Example 1 except that PVDF instead of PVDF-HFP as a polymer for forming a protective layer was used.

Example 3: Manufacture of Lithium Electrode

A lithium electrode was manufactured in the same manner as in Example 1 except that a current collector having SiO coating layers on both sides thereof was used.

At this time, in order to form the SiO coating layer, the mixture of SiO and graphite in a weight ratio of 1:1 was dissolved in ethanol solvent to form a coating solution with 1 M concentration.

The coating solution was coated on both sides of the current collector by 80 μm in thickness using a slot-die coater to form SiO coating layers.

Comparative Example 1: Manufacture of Lithium Electrode by Direct Deposition on the Current Collector Lithium metal was directly deposited on the Cu current collector to form a lithium metal layer, and then a PVDF-HFP coating solution was coated on the lithium metal layer to form a lithium electrode. At this time, the deposition process was performed by evaporation deposition at a temperature of 600° C. to form a lithium metal layer having a thickness of 12 μm, and the PVDF-HFP coating solution was prepared by dissolving PVDF-HFP (Arkema, LBG Grade) in NMP solvent to be a 5% solution and then a PVDF-HFP protective layer was prepared on the lithium metal layer by spin coating.

Experimental Example 1: Comparison of Manufactured Lithium Electrode

FIG. 9 is a photograph showing the lithium electrode manufactured in Example 1, and FIG. 10 is a photograph showing the lithium electrode manufactured in Comparative Example 1.

Referring to FIG. 9, it was confirmed that a normal lithium electrode is manufactured in Example 1 by transfer.

On the other hand, referring to FIG. 10, it was confirmed in the case of Comparative Example 1 that wrinkle phenomenon occurs due to direct deposition process on the Cu current collector. It can be seen that the wrinkle phenomenon is a folding and tearing phenomenon and this phenomenon appears by direct deposition process on the Cu current collector having a thin thickness.

Although the present invention has been described with reference to the limited examples and drawings, it is to be understood that the present invention is not limited thereto and that various modifications and variations are possible within the scope of the claims to be described below and the technical idea of the present invention.

DESCRIPTION OF SYMBOLS

10: Current collector
20a, 20b: Lithium metal layer
30a, 30b: Protective layer
40a, 40b: Substrate
41: Release layer
50a, 50b: SiO coating layer
60: Stacked structure

The invention claimed is:

1. A lithium electrode comprising:
   a current collector;
   a SiO coating layer on each side of the current collector, wherein each SiO coating layer has a thickness of 60 μm to 120 μm;
   a lithium metal layer on each SiO coating layer; and
   a protective layer on each lithium metal layer,
   wherein each protective layer consists of at least one selected from the group consisting of poly vinylidene fluoride (PVDF), poly vinylidene fluoride-hexafluoro-ethylene copolymer (PVDF-HFP copolymer), cyclo olefin polymer, cyclo olefin copolymer and styrene butadiene rubber-carboxymethyl cellulose (SBR-CMC).

2. The lithium electrode according to claim 1, wherein each SiO coating layer is a mixed coating layer comprising SiO and graphite.

3. The lithium electrode according to claim 2, wherein the SiO and graphite are mixed in a weight ratio of 1:1 to 1:9.

4. The lithium electrode according to claim 1, wherein the current collector is selected from the group consisting of copper; stainless steel; aluminum; nickel; titanium; sintered carbon; stainless steel whose surface is treated with carbon, nickel, titanium, or silver; and aluminum-cadmium alloy.

5. The lithium electrode according to claim 1, wherein each lithium metal layer has a thickness of 1 to 50 μm.

6. The lithium electrode according to claim 1, further comprising a substrate on each protective layer.

7. The lithium electrode according to claim 6, further comprising a release layer on each substrate.

8. The lithium electrode according to claim 7, wherein each release layer comprises at least one selected from the group consisting of a silicone-based resin, a melamine-based resin and a fluorine-based resin.

9. The lithium electrode according to claim 6, wherein each substrate comprises at least one selected from the group consisting of polyethylene terephthalate (PET), polyimide (PI), poly(methylmethacrylate) (PMMA), cellulose tri-acetate (TAC), polypropylene, polyethylene and polycarbonate.

10. A lithium secondary battery comprising the lithium electrode according to claim 1.

11. A method for preparing a lithium electrode comprising:
   (S1) forming a protective layer on at least one side of a substrate;
   (S2) forming a lithium metal layer on the protective layer, wherein the protective layer comprises at least one selected from the group consisting of poly vinylidene fluoride (PVDF), poly vinylidene fluoride-hexafluoro-ethylene copolymer (PVDF-HFP copolymer), cyclo olefin polymer, cyclo olefin copolymer and styrene butadiene rubber-carboxymethyl cellulose (SBR-CMC); and
   (S3) transferring the product of (S2) onto at least one side of a current collector with the lithium metal layer facing the current collector,
   wherein a SiO coating layer is present on each side of the current collector, and wherein each SiO coating layer has a thickness of 60 μm to 120 μm.

12. The method according to claim 11, further comprising removing the substrate after S3.

13. The lithium electrode according to claim 1, wherein each protective layer has a thickness of 0.1 to 1 μm.

* * * * *